(12) United States Patent  (10) Patent No.: US 9,192,155 B2
Saringer et al.  (45) Date of Patent: Nov. 24, 2015

(54) DECOY STAND

(75) Inventors: Donald J. Saringer, Neenah, WI (US);
Travis G. Bersch, Menasha, WI (US)

(73) Assignee: MALLARD MOTELS, LLC, Appleton, WI (US)

( * ) Notice: Subject to any disclaimer, the term of this patent is extended or adjusted under 35 U.S.C. 154(b) by 480 days.

(21) Appl. No.: 13/554,555

(22) Filed: Jul. 20, 2012

(65) Prior Publication Data

US 2013/0019514 A1     Jan. 24, 2013

Related U.S. Application Data

(60) Provisional application No. 61/510,234, filed on Jul. 21, 2011, provisional application No. 61/583,282, filed on Jan. 5, 2012.

(51) Int. Cl.
*A01M 31/06*     (2006.01)

(52) U.S. Cl.
CPC ..................... *A01M 31/06* (2013.01)

(58) Field of Classification Search
CPC ..................................................... A01M 31/06
USPC ...................... 43/2, 3; 47/47; 211/85.23, 196; 248/156, 127, 146, 150, 157, 423
See application file for complete search history.

(56) References Cited

U.S. PATENT DOCUMENTS

| | | | | |
|---|---|---|---|---|
| 649,874 | A | * | 5/1900 | Payne ........................ 47/41.11 |
| 740,293 | A | * | 9/1903 | Loeble ................. A01M 31/06 43/3 |
| 983,589 | A | | 2/1911 | Wendt |
| 1,073,763 | A | | 9/1913 | Kalitzky |
| 1,107,075 | A | * | 8/1914 | Karges ......................... 248/414 |
| 1,266,749 | A | | 5/1918 | Abbott |
| 1,590,637 | A | | 6/1926 | Marengo |
| 1,629,442 | A | * | 5/1927 | Geisinger ............. A01M 31/06 43/3 |
| 1,831,286 | A | * | 11/1931 | Chelini ............................. 43/3 |
| 2,246,574 | A | | 6/1941 | Coe |
| 2,547,286 | A | | 4/1951 | Sabin |
| 2,616,200 | A | | 11/1952 | Milam |
| 2,624,144 | A | | 1/1953 | Beverman |
| 2,787,074 | A | * | 4/1957 | Miller ............................. 43/3 |
| 2,952,090 | A | | 9/1960 | Pittenger |
| 3,642,145 | A | * | 2/1972 | Shelton ....................... 211/196 |
| 3,768,192 | A | | 10/1973 | Caccamo |
| 4,660,313 | A | | 4/1987 | Bauernfeind et al. |
| 5,074,071 | A | | 12/1991 | Dunne |
| 5,342,661 | A | * | 8/1994 | Wilcox, II ................... 211/196 |
| 5,425,203 | A | * | 6/1995 | Scott ....................... A01G 9/12 47/47 |
| 5,832,649 | A | * | 11/1998 | Kilgore ............................ 43/2 |
| 6,234,444 | B1 | | 5/2001 | Haddad |
| 6,481,147 | B2 | * | 11/2002 | Lindaman ........................ 43/2 |

(Continued)

OTHER PUBLICATIONS

Macks Prairie Wings, Great Day Hot Wings Duck Decoy Tree, printed from web-site http://www.mackspw.com Jul. 22, 2011) 2 pages.

(Continued)

*Primary Examiner* — Darren W Ark
(74) *Attorney, Agent, or Firm* — Michael Best & Friedrich LLP

(57) ABSTRACT

A decoy stand includes a tubular base pole, a tubular sleeve coaxially supported on a top end of the base pole, and an extension pole telescopically received within the tubular base pole and the tubular sleeve. At least one decoy mount is coupled to each of the tubular sleeve and the extension pole.

15 Claims, 11 Drawing Sheets

(56) References Cited

U.S. PATENT DOCUMENTS

| | | | |
|---|---|---|---|
| 6,595,377 B1 * | 7/2003 | Hetu | 211/85.23 |
| 6,655,071 B2 | 12/2003 | Barnes et al. | |
| 6,675,522 B2 * | 1/2004 | Mathews | 43/3 |
| 6,775,943 B2 * | 8/2004 | Loughman | 43/2 |
| 6,857,215 B1 * | 2/2005 | Rickrode | 43/3 |
| 6,907,688 B2 * | 6/2005 | Brint | 43/2 |
| 6,938,370 B2 | 9/2005 | Johns | |
| 6,948,694 B1 | 9/2005 | Gilbert | |
| 7,043,865 B1 * | 5/2006 | Crowe | 43/3 |
| 7,137,221 B2 * | 11/2006 | Highby et al. | 43/2 |
| 7,458,475 B2 | 12/2008 | Ho | |
| 7,536,823 B2 * | 5/2009 | Brint | 43/2 |
| D670,353 S * | 11/2012 | Saringer et al. | D22/125 |
| D671,187 S * | 11/2012 | Saringer | D22/125 |
| 8,316,575 B2 * | 11/2012 | Bradley | 43/2 |
| D675,700 S * | 2/2013 | Saringer et al. | D22/125 |
| D675,701 S * | 2/2013 | Saringer et al. | D22/125 |
| 8,484,883 B2 * | 7/2013 | Rogers | 43/2 |
| 2003/0024146 A1 | 2/2003 | Spady et al. | |
| 2003/0173474 A1 | 9/2003 | Taylor | |
| 2004/0237373 A1 * | 12/2004 | Coleman | 43/3 |
| 2006/0053675 A1 * | 3/2006 | Lindaman | 43/2 |
| 2006/0143969 A1 * | 7/2006 | Lindaman | 43/2 |
| 2007/0251135 A1 * | 11/2007 | Watlov et al. | 43/3 |
| 2008/0184610 A1 * | 8/2008 | Pfeifle | 43/3 |
| 2011/0303806 A1 * | 12/2011 | Samaras et al. | 248/156 |
| 2012/0090217 A1 * | 4/2012 | Young | 43/3 |
| 2012/0312939 A1 * | 12/2012 | Elsperger | 248/157 |
| 2013/0014422 A1 * | 1/2013 | Bullerdick et al. | 43/3 |
| 2013/0174466 A1 * | 7/2013 | Saringer | 43/2 |
| 2013/0212924 A1 * | 8/2013 | Shisko | 43/2 |
| 2014/0245652 A1 * | 9/2014 | Franklin | 43/2 |

OTHER PUBLICATIONS

Cabela's, Waterfowl Catalog (2010) pp. 38-41.

* cited by examiner

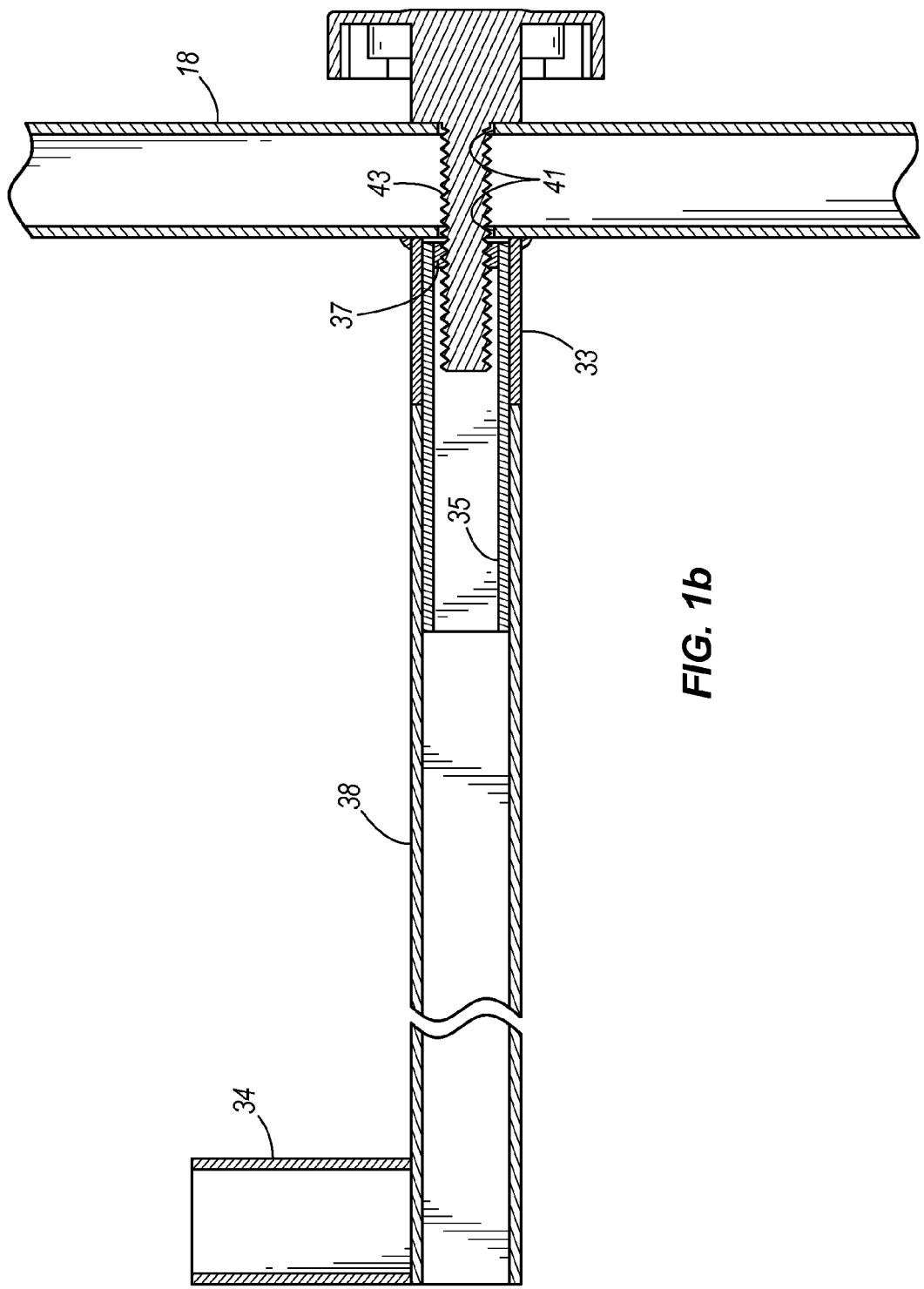

DECOY STAND

CROSS-REFERENCE TO RELATED APPLICATIONS

This application claims priority to U.S. Provisional Patent Application No. 61/510,234 filed on Jul. 21, 2011 and U.S. Provisional Patent Application No. 61/583,282 filed on Jan. 5, 2012, the entire contents of both of which are incorporated herein by reference.

FIELD OF THE INVENTION

The present invention relates to decoy stands in general and more particularly to an improved decoy stand assembly for deploying a plurality of decoys.

BACKGROUND OF THE INVENTION

Decoys have been used extensively by hunters to attract duck, geese, and other fowl. Typically, decoys are mounted individually on a stand and may have wings that are movable (e.g., by wind gusts, by an electric motor, etc.) to give an appearance as if the decoy is flapping its wings.

SUMMARY OF THE INVENTION

The invention provides, in one aspect, a user configurable decoy stand including a base pole and at least one extension pole having a mount thereon. The decoy stand is configurable by the user to change the position of the mounts and the number of mounts, and therefore the number of decoys that may be supported, on the decoy stand.

The invention provides, in another aspect, a decoy stand including a tubular base pole, a tubular sleeve coaxially supported on a top end of the base pole, and an extension pole telescopically received within the tubular base pole and the tubular sleeve. At least one decoy mount is coupled to each of the tubular sleeve and the extension pole.

The invention provides, in yet another aspect, a decoy stand including a tubular base pole having a top end and a tapered lower end to facilitate pushing the base pole into the ground, an extension pole telescopically received within the tubular base pole, a stop coupled to the extension pole to limit an extent to which the extension pole is telescopically received within the tubular base pole, a first decoy mount attached directly to the extension pole, a second decoy mount, and an arm coupling the second decoy mount to the extension pole. The arm with the second decoy mount is removably coupled to the extension pole.

Other features and aspects of the invention will become apparent by consideration of the following detailed description and accompanying drawings.

BRIEF DESCRIPTION OF THE DRAWINGS

FIG. 1b is an enlarged, cross-sectional view of a portion of the first extension assembly through line 1b-1b in FIG. 1a.

DETAILED DESCRIPTION

Figure 1A:
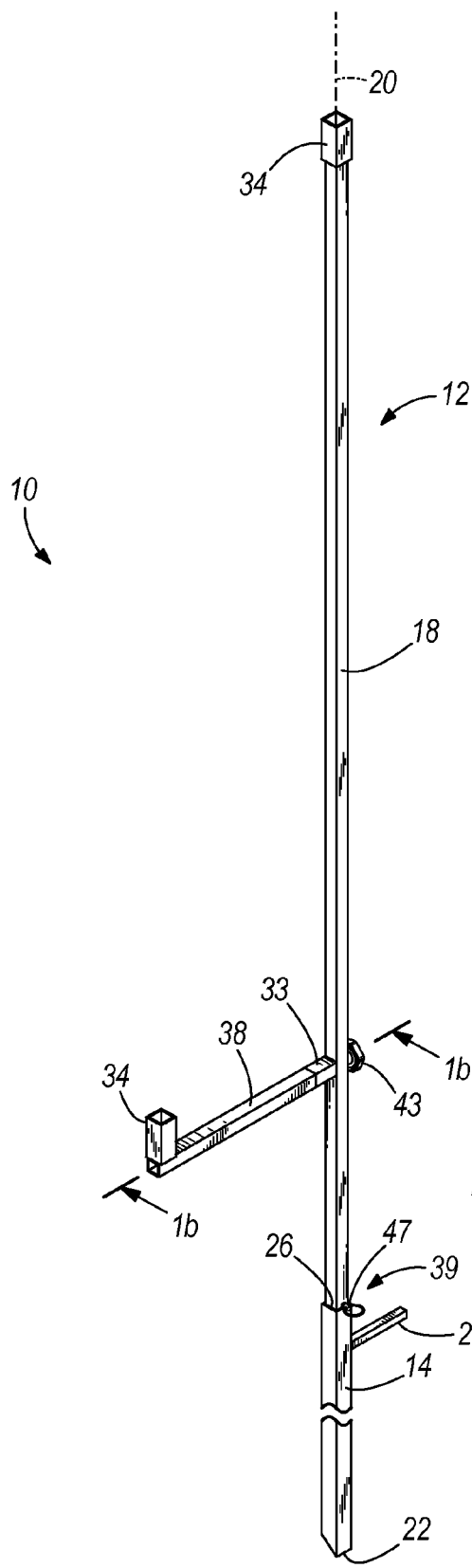
FIG. 1a is a perspective view of a decoy stand in accordance with a first embodiment of the invention with a first extension assembly.

A first embodiment of a decoy stand 10, illustrated in FIG. 1a, includes a first extension assembly 12 and a tubular base pole 14. The first extension assembly 12 includes an extension pole 18 having a longitudinal axis 20. The extension pole 18 is capable of being slidingly and telescopically received within the tubular base pole 14 and includes an outer periphery sized to provide a snug fit within the tubular base pole 14. In the illustrated construction of the decoy stand 10, the extension pole 18 is made from 16 gauge square-tube steel having a nominal dimension of 0.75 inches by 0.75 inches, while the base pole 14 is made from 14 gauge square-tube steel having a nominal dimension of 1 inch by 1 inch. Alternatively, the base pole 14 and the extension pole 18 may be made from a tubular material having any of a number of different sizes and/or shapes that facilitate a snug, sliding or telescoping fit between the base pole 14 and the extension pole 18.

With continued reference to FIG. 1a, the base pole 14 includes a tapered lower end 22 to facilitate pushing the base pole 14 into the ground. The base pole 14 also includes an upper or top end 26 having an opening through which the extension pole 18 is received. The base pole 14 also includes a step 28 located nearer the top end 26 than the lower end 22 upon which the user of the decoy stand 10 may step to push the base pole 14 into the ground. The extension pole 18 also includes a tapered lower end 29 (FIG. 9) to facilitate pushing the extension pole 18 directly into the ground should the user of the decoy stand 10 decide not to use the base pole 14.

With reference to FIG. 1a, the first extension assembly 12 includes two decoy mounts 34, each of which is configured to support a hunting decoy (e.g. a duck). The mounts 34 are each made from square-tube steel having a nominal dimension that is similar to the base pole 14. Although not shown, the hunting decoy includes a square projection having a nominal dimension similar to that of the extension pole 18. The square projection on the decoy is received within the mount 34 in a sliding or telescoping manner to support the decoy upon the decoy stand 10. Alternatively, if the user desires, another extension assembly 12 may be placed in the mount 34 instead of a decoy.

One of the mounts 34 on the extension pole 18 is offset from the longitudinal axis 20 of the extension pole 18 by an arm 38, while the other mount 34 is coaxial with the longitudinal axis 20. The mounts 34 may be welded to the arm 38 and the extension pole 18, respectively. Alternatively, any of a number of different processes may be used to secure the mounts 34 to the arm 38 and the extension pole 18, respectively. In the illustrated construction of the decoy stand 10, the arm 38 is detachably or removably coupled to the extension pole 18 to facilitate storage, transport, and packaging of the decoy stand 10. Specifically, with reference to FIG. 1b, the extension pole 18 includes a tubular sleeve 33, having the same nominal cross-sectional dimensions as the arm 38, welded to one of the side walls of the extension pole 18. The arm 38 includes a tubular insert 35 received in an end of the arm 38 opposite the decoy mount 34 (using, for example, a press or interference fit), and a nut 37 secured within the tubular insert 35. Apertures 41 in the extension pole 18 are aligned with the nut 37, and a threaded fastener 43 is inserted through the apertures 41 and engaged with the nut 37 to secure the arm 38 to the extension pole 18. The threaded fastener 43 may be unthreaded from the nut 37 to permit removal of the arm 38 from the extension pole 18. Alternatively, The arm 38 may be welded to the extension pole 18.

Figure 10:
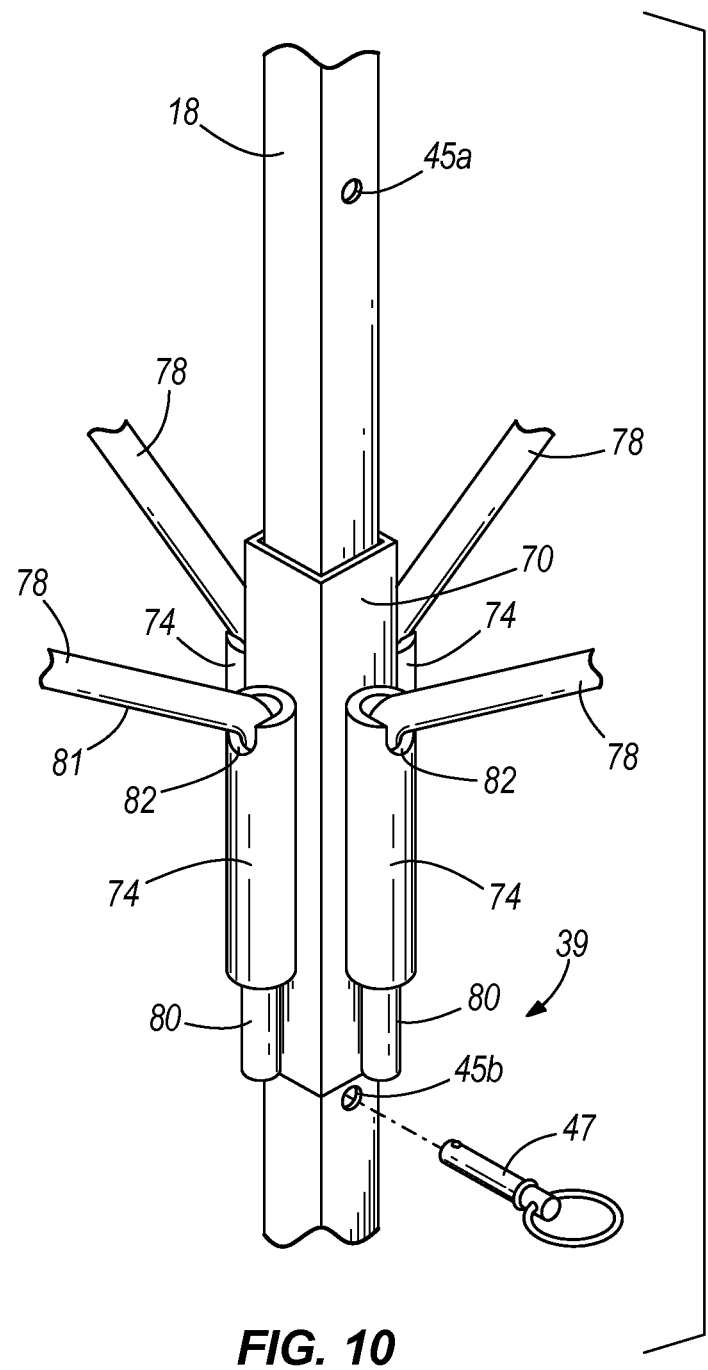
FIG. 10 is an enlarged, partially exploded perspective view of the first and fourth extension assemblies of FIG. 9.

With reference to FIG. 1a, the first extension assembly 12 also includes a stop 39 coupled to one of the side walls of the extension pole 18 that is engageable with the top end 26 of the base pole 14 to limit the extent to which the extension pole 18 may telescope within the base pole 12. In the illustrated construction of the decoy stand 10, the stop 39 is configured as a pin 47 that is removably received within one of multiple spaced apertures 45a, 45b through the extension pole 18 (FIG. 10). The higher aperture 45a is positioned approximately 18 inches below the arm 38 to ensure that the lowermost decoy supported on the first extension assembly 12 is located approximately 18 inches above the top end 26 of the base pole 12 (FIG. 1a), while the lower aperture 45b is located farther from the arm 38 to position the lower-most decoy supported on the first extension assembly 12 at a higher elevation. Alternatively, the higher aperture 45a may be positioned at any desired distance from the arm 38.

As another alternative, the stop 39 may be omitted, and the arm 38 on the extension pole 18 may function as the stop to limit the extent to which the extension pole 18 may be received within the base pole 14. Further, an adjustable detent arrangement may be utilized between the base pole 14 and the extension pole 18 to define one or more predefined lengths of the combined base pole 14 and extension pole 18. For example, a spring-biased detent may be incorporated on the extension pole 18, and the base pole 14 may include one or more slots or apertures (not shown) within which the detent may be received to define one or more predefined lengths of the combined base pole 14 and extension pole 18.

Figure 2:
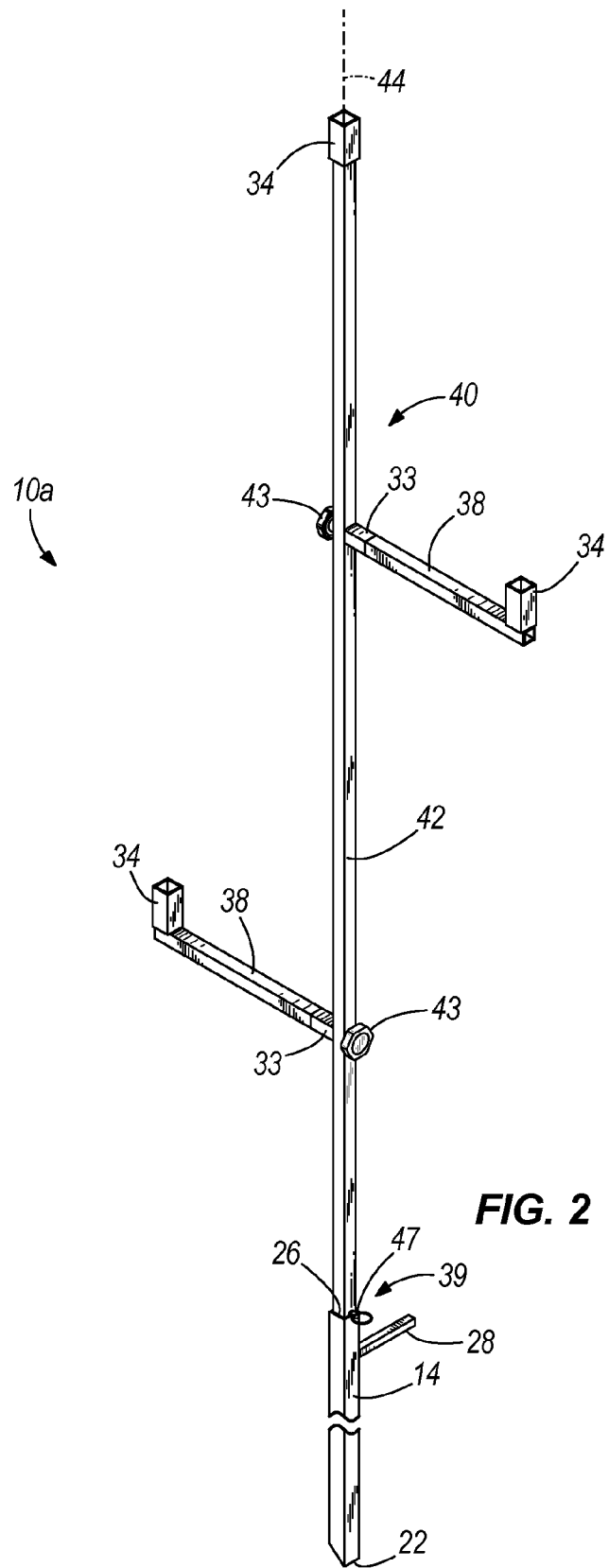
FIG. 2 is a perspective view of a decoy stand in accordance with a second embodiment of the invention with a second extension assembly.

A second embodiment of a decoy stand 10a is illustrated in FIG. 2. The same base pole 14 used in connection with the decoy stand 10 is also used in the decoy stand 10a. As such, like features are described with like reference numerals and will not be described again in detail. The decoy stand 10a includes a second extension assembly 40 having an extension pole 42 that is received within the base pole 14 in a sliding or telescoping manner like the extension pole 18 of the first extension assembly 18. The extension pole 42 may include a tapered lower end to facilitate pushing the extension pole 42 directly into the ground should the user of the decoy stand 10a decide not to use the base pole 14.

The second extension assembly 40 also includes two mounts 34 that are offset from a longitudinal axis 44 of the extension pole 42 by respective arms 38, and a third mount 34 that is coaxial with the longitudinal axis. In the illustrated construction of the second extension assembly 40, the mounts 34 are offset in opposite directions with respect to the longitudinal axis 44. Alternatively, the mounts 34 may be offset in the same direction, or at a right angle to each other, with respect to the longitudinal axis 44. The arms 38 are detachably or removably coupled to the extension pole 42 in a similar manner as the arm 38 of the first extension assembly 12. The second extension assembly 40 also includes a stop 39 identical to that used in the first extension assembly 12 to limit the extent to which the extension pole 42 may be received within the base pole 14. Alternatively, the stop 39 may be omitted, or an adjustable detent arrangement may be utilized between the base pole 14 and the extension pole 42 to define one or more predefined lengths of the combined base pole 14 and extension pole 42.

Figure 3:
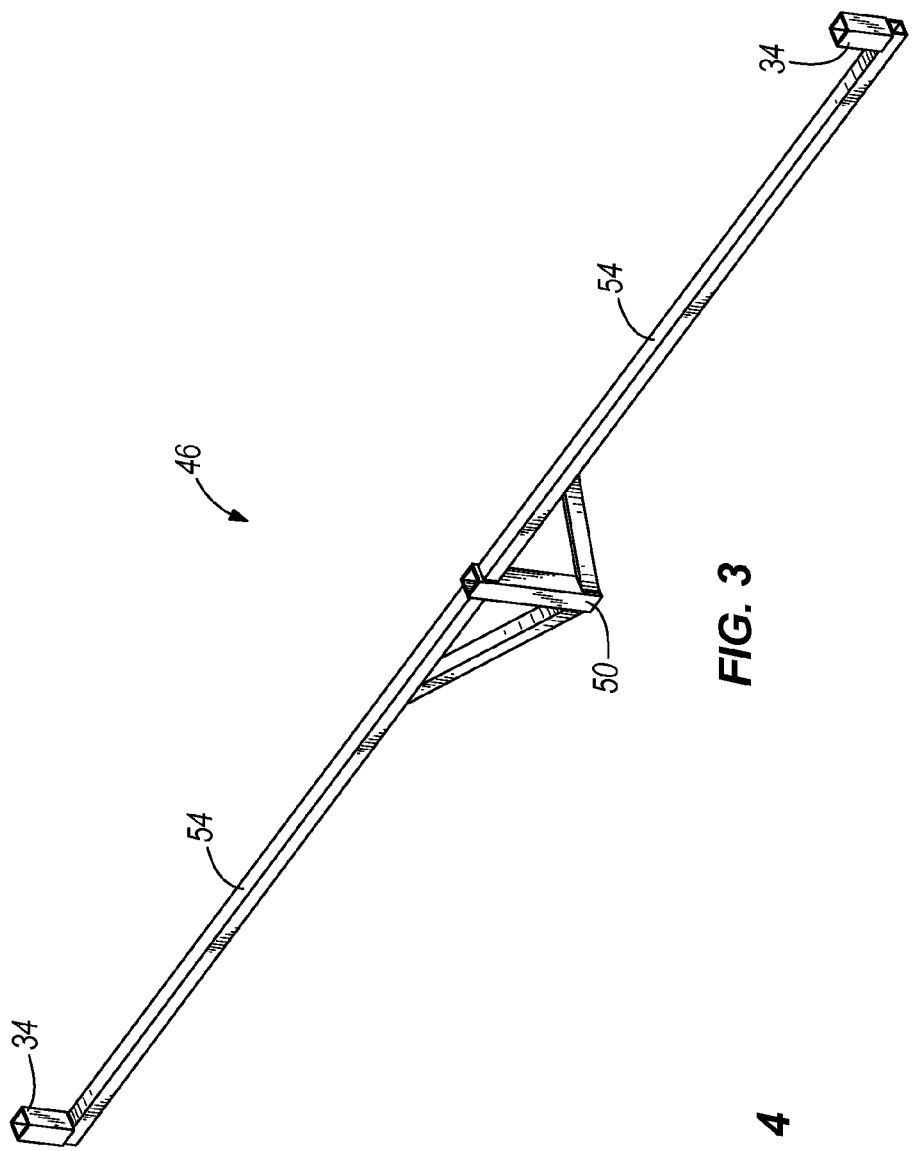
FIG. 3 is a perspective view of a third extension assembly that may be used with either of the decoy stands of FIGS. 1 and 2.

A third extension assembly 46, illustrated in FIG. 3, may be used in conjunction with one of the decoy stands 10, 10a of FIGS. 1a and 2, respectively. The third extension assembly 46 includes a tubular sleeve 50, two transverse arms 54 and two mounts 34. The mounts 34 are identical to the mounts described in connection with the first and second extension assemblies 12, 40, and will not be described again in detail. The sleeve 50 is made from square-tube steel having a nominal dimension that is similar to the base pole 14. Each transverse arm 54 couples the sleeve 50 to one mount 34. The mounts 34 are positioned at opposite ends of the third extension assembly 46.

Figure 7:
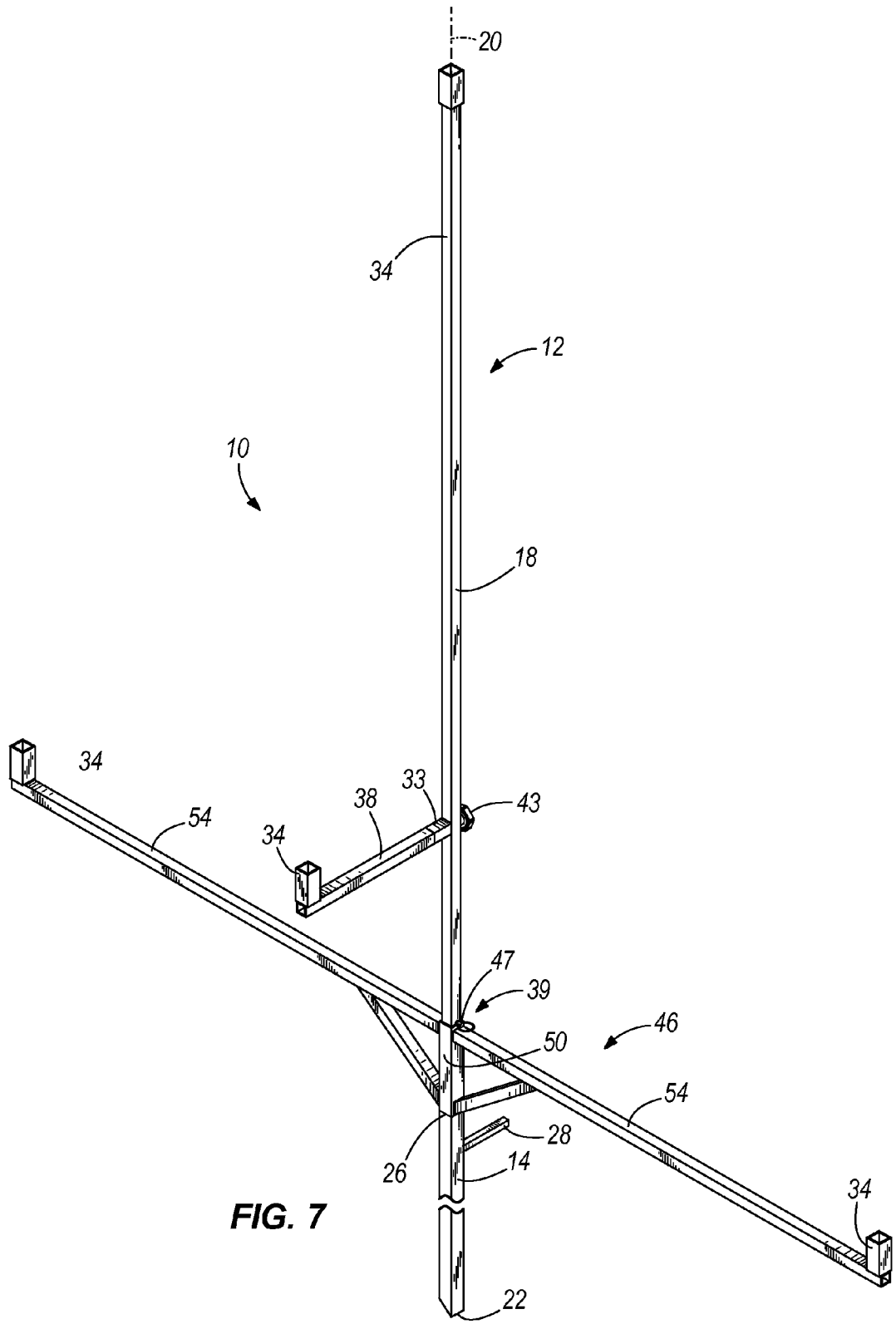
FIG. 7 is a perspective view of the third extension assembly of FIG. 3 used in conjunction with the decoy stand of FIG. 1.

The third extension assembly 46 may be used in conjunction with either of the decoy stands 10, 10a by consecutively inserting one of the extension poles 18, 42 through the tubular sleeve 50 and then the tubular base pole 14, thereby coaxially positioning and supporting the tubular sleeve 50 (and therefore the remainder of the third extension assembly 46) upon the top end 26 of the base pole 14. FIG. 7 illustrates the third extension assembly 46 used in conjunction with the decoy stand 10, in which the stop 39 is engaged with a top end of the tubular sleeve 50 to limit the extent to which the extension pole 18 is telescopically received within the tubular sleeve 50 and the base pole 14. Such a combination provides four mounts 34 upon which four decoys, respectively, may be supported. Alternatively, should the third extension assembly 46 be used in conjunction with the decoy stand 10a, five mounts 34 are provided upon which five decoys, respectively, may be supported.

Figure 6:
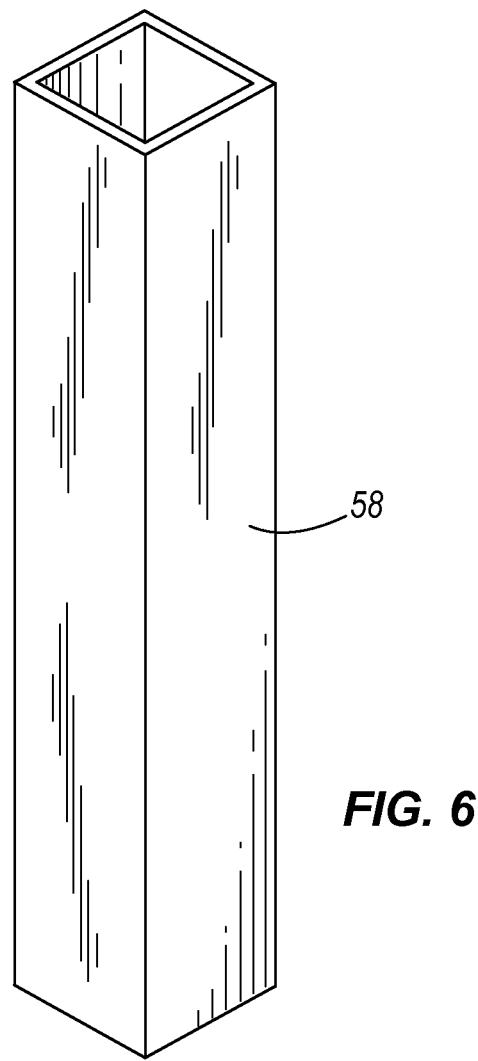
FIG. 6 is a perspective view of a connecting tube.

The third extension assembly 46 may be used with one of the extension assemblies 12, 40 in an alternative fashion. For example, the third extension assembly 46 may be coupled to one of the mounts 34 on the extension assemblies 12, 40 with a connecting tube 58 (FIG. 6) that is slidingly received in the mount 34 and the sleeve 50 to secure the third extension assembly 46 upon the mount 34.

Figure 4:
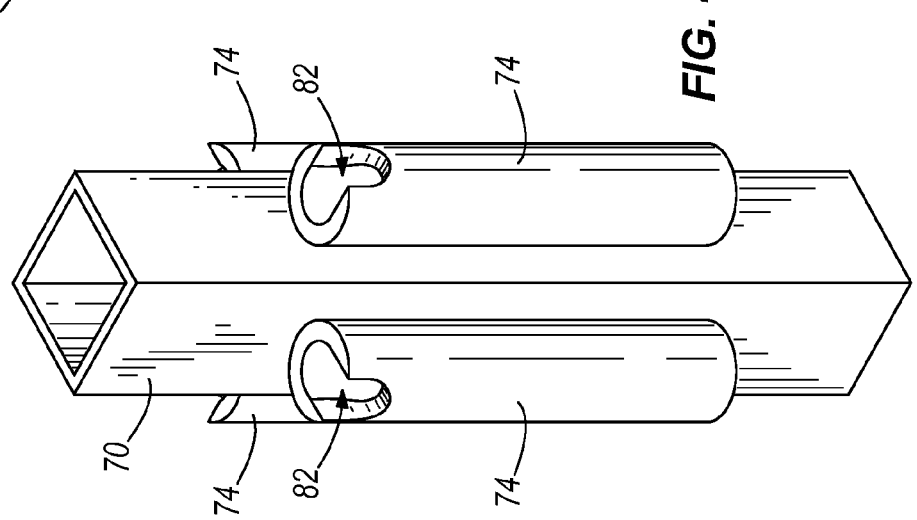
FIG. 4 is an enlarged perspective view of a portion of a fourth extension assembly that may be used with either of the decoy stands of FIGS. 1 and 2.
Figure 5:
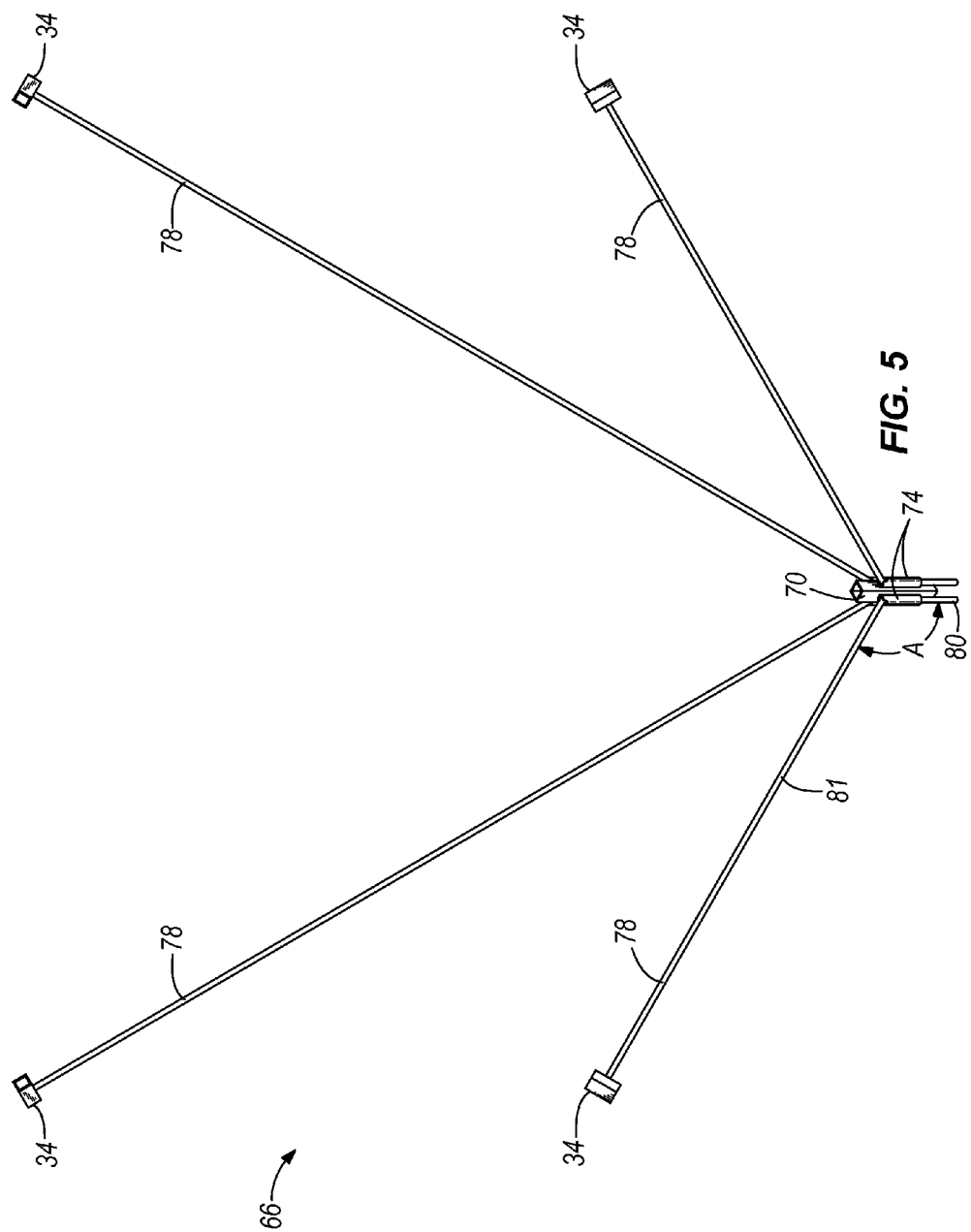
FIG. 5 is a perspective view of the fourth extension assembly that may be used with either of the decoy stands of FIGS. 1 and 2.

A fourth extension assembly 66, illustrated in FIG. 5, may be used in conjunction with one of the first and second extension assemblies 12, 40. The fourth extension assembly 66 includes a tubular sleeve 70 (FIG. 4) made from square-tube steel having a nominal dimension that is similar to the base pole 14. The fourth extension assembly 66 also includes a plurality of sleeve mounts 74 attached to the outer periphery of the tubular sleeve 70, and a corresponding plurality of extension arms 78 that are capable of being slidingly received within the sleeve mounts 74. Decoy mounts 34, identical to those described in connection with the extension assemblies 12, 40, 46, are disposed on an end of each extension arm 78 (FIG. 5).

Each extension arm 78 includes a first segment 80 that is received within one of the sleeve mounts 74 and a second segment 81 interconnecting the first segment 80 and the mount 34. The thickness and length of the extension arms 78, in addition to the included angle A (FIG. 8) between the first and second segments 80, 81 of the arms 78, are sized such that the second segments 81 of the respective arms 78 assume a substantially horizontal orientation with respect to the ground upon securing decoys to the mounts 34 on the respective extension arms 78. To achieve this orientation, the included angle A between the first and second segments 80, 81 of the arms 78, when not supporting a decoy, may be between about 90 degrees and about 135 degrees.

With reference to FIG. 4, each of the sleeve mounts 74 includes a slot 82 within which the second segment 81 of a respective extension arm 78 is received. As such, the width of the slot 82 locates the extension arm 78 within a range of orientations with respect to the tubular sleeve 70 to prevent decoys supported on adjacent extension arms 78 from contacting each other. The width of each of the slots 82 is also sufficiently large to permit the respective extension arms 78 to pivot a limited amount within the sleeve mounts 74 in response to a wind gust, thereby giving an appearance of movement to the decoys. Alternatively, different structure may be used to secure the extension arms 78 to the sleeve mounts 74.

The fourth extension assembly 66 may be used in conjunction with one of the first and second extension assemblies 12, 40 in the same manner as the third extension assembly 46. Particularly, one of the extension poles 18, 42 is consecutively inserted through the tubular sleeve 70 and then the tubular base pole 14, thereby coaxially positioning and supporting the tubular sleeve 70 (and therefore the remainder of the fourth extension assembly 66) upon the top end 26 of the base pole 14. The stop 39 is engaged with a top end of the tubular sleeve 70 to limit the extent to which the extension poles 18, 42 are telescopically received within the tubular sleeve 50 and the base pole 14.

Figure 8:
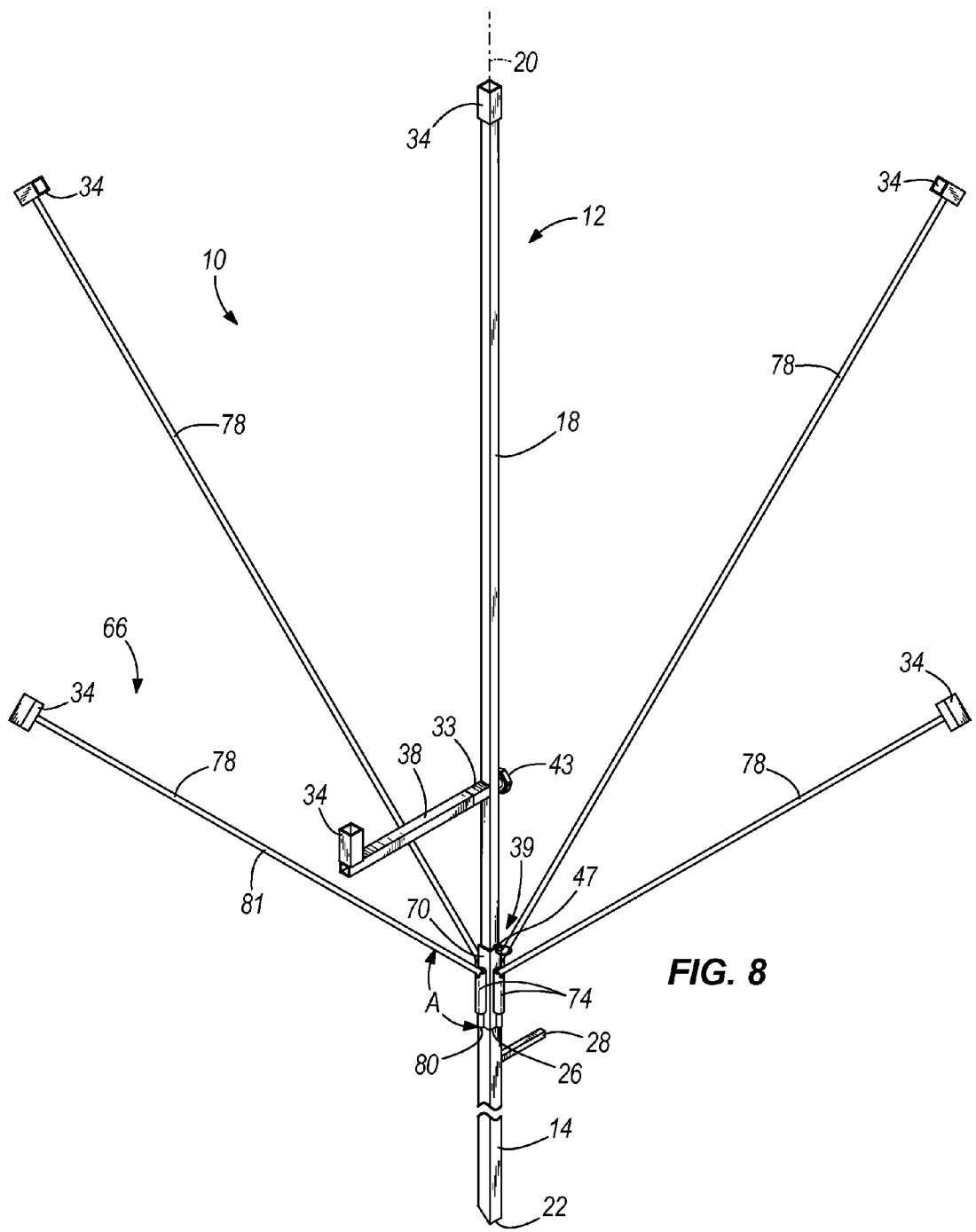
FIG. 8 is a perspective view of the fourth extension assembly of FIG. 5 used in conjunction with the decoy stand of FIG. 1.

FIG. 8 illustrates the fourth extension assembly 66 used in conjunction with the decoy stand 10. Such a combination provides six mounts 34 upon which six decoys, respectively, may be supported. Alternatively, should the fourth extension assembly 66 be used in conjunction with the decoy stand 10a, seven mounts 34 are provided upon which seven decoys, respectively, may be supported. The stop 39 on the extension pole 18 limits the extent to which the extension pole 18 may be received within the tubular sleeve 70 to prevent any interference between the arm 38 and any of the extension arms 78 on the extension assembly 66. Alternatively, if the user desires, both of the third and fourth extension assemblies 46, 66 may be used in conjunction with one of the first and second extension assemblies 12, 40 at the same time such that the third and fourth extension assemblies 46, 66 are stacked upon each other and the base pole 14.

Figure 9:
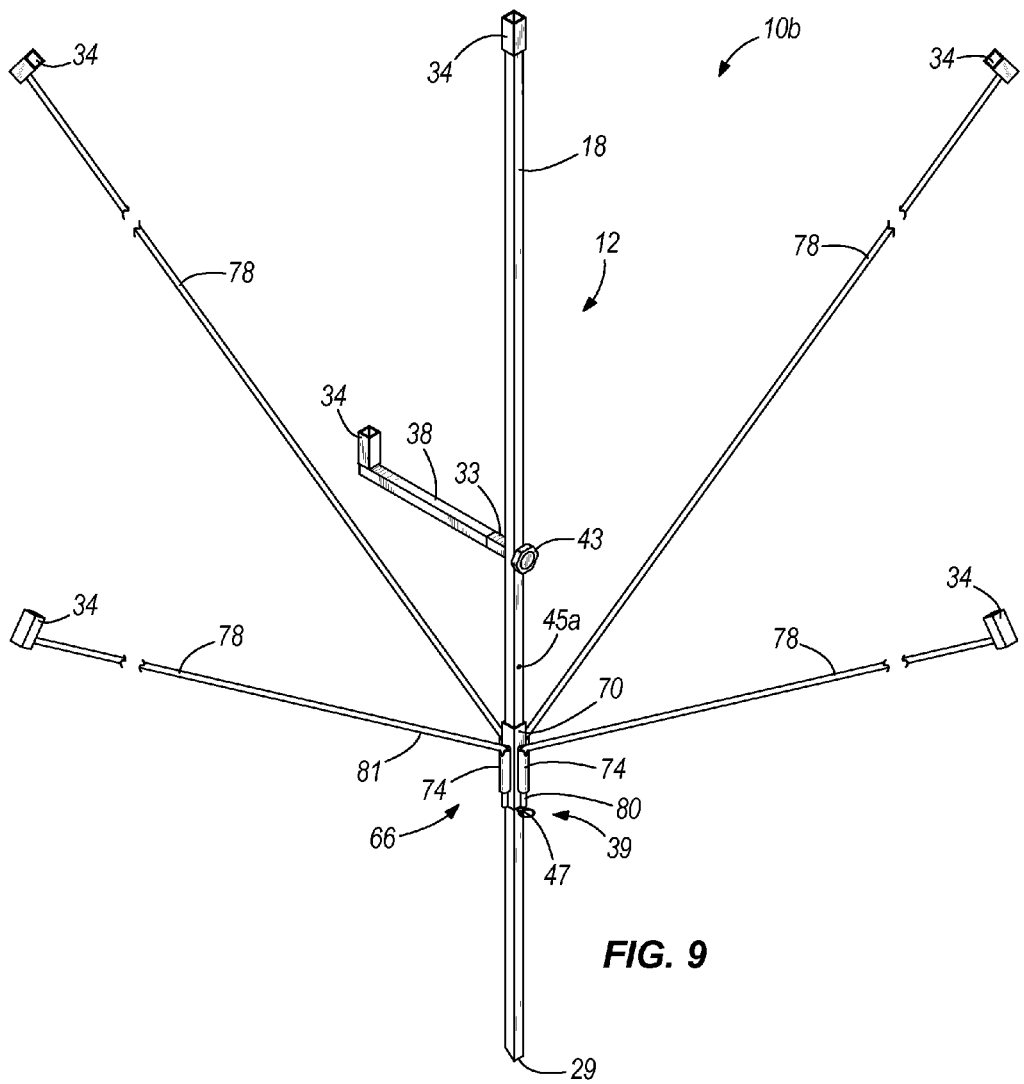
FIG. 9 is a perspective view of the fourth extension assembly of FIG. 5 supported upon the first extension assembly of FIG. 1.

With reference to FIG. 9, another decoy stand 10b is shown comprised of the first extension assembly 12 and the fourth extension assembly 66. Particularly, the bottom end of the tubular sleeve 70 is engaged with and therefore supported upon the stop 39. In the illustrated construction of the decoy stand 10b, the stop 39 is received within the lower aperture 45b. Alternatively, the stop 39 may be repositioned within the higher aperture 45a to position the decoy mounts 34 at a higher elevation. In use, the decoy stand 10b may be anchored to the ground by the user pushing the tapered lower end 29 of the extension pole 18 into the ground.

Figure 11:
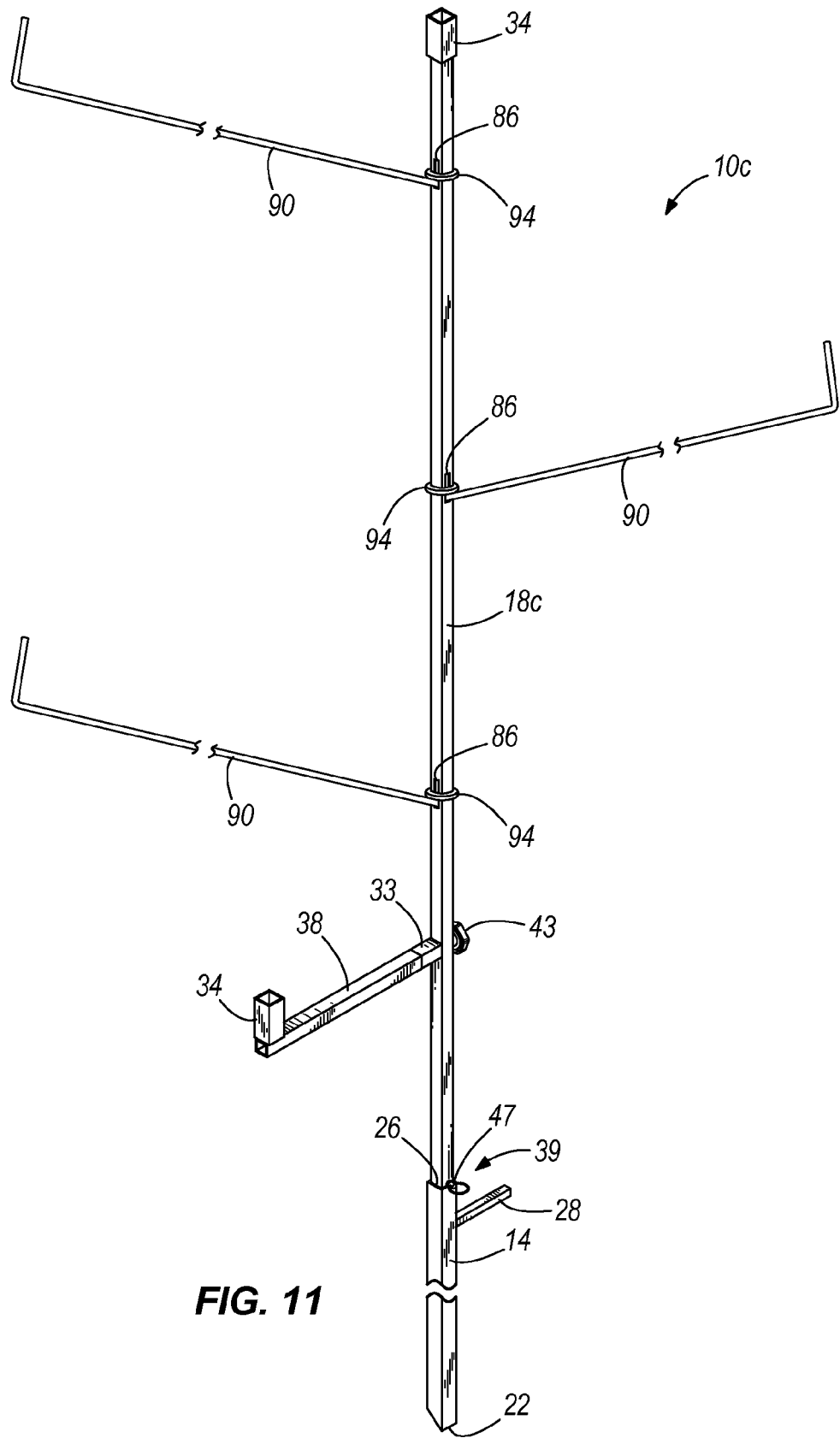
FIG. 11 is a perspective view of a decoy stand in accordance with a third embodiment of the invention with a fifth extension assembly Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

FIG. 11 illustrates yet another decoy stand 10c that is a modification of the decoy stand 10. As such, like features and components are identified with like reference numerals and will not be described again in detail. The extension pole 18c includes three slots 86 spaced from each other along the pole 18c in which respective decoy-supporting extension arms 90 are received. The slots 86 are arranged on the pole 18c in a helical-like pattern, with vertically adjacent slots 86 being separated from each other by about 1 foot and located on adjacent side walls of the pole 18c. By arranging the slots 86 in this pattern, the decoys appear in a vertically staggered array around the pole 18c.

The decoy stand 10c further includes bands 94 positioned around the outer periphery of the extension pole 18c. Each band 94 is positioned proximate a slot 86 and is moveable or slideable on the pole 18c. The bands 94 have a circular shape with an aperture through which the pole 18c is received. The bands 94 are made of rubber. Alternatively, the bands 94 may be made of any elastic material. To prevent the extension arms 90 from inadvertently falling out of their respective slots 86 during a period of high wind, for example, the bands 94 are positioned around the slots 86 and engage the respective arms 90. In other words, the band 94 inhibits inadvertent removal of the decoy-supporting extension arm 90 from the slot 86 as wind gusts cause the extension arm 90 to sway relative to the pole 18c.

The decoy stands 10, 10a, 10b, 10c are user configurable to adjust the number and position of decoys that may be supported by the decoy stands 10, 10a, 10b, 10c. For example, the decoy stands 10, 10a, 10b, 10c described herein may configured to use only two decoys (using the first extension assembly 12), and as many as nine decoys (using a combination of the second extension assembly 40, the third extension assembly 46, and the fourth extension assembly 66). Even more decoys may be supported should the connecting tube 58 be utilized to stack multiple extension assemblies 46, 66 upon the mounts 34 on the first or second extension assemblies 12, 40.

Various features of the invention are set forth in the following claims.

What is claimed is:
1. A decoy stand comprising:
   a tubular base pole having a top end;
   a tubular sleeve coaxially supported on the top end of the base pole;
   an extension pole telescopically received within the tubular base pole and the tubular sleeve; and
   a first decoy mount coupled to the tubular sleeve and a second decoy mount coupled to the extension pole;
   wherein the tubular sleeve includes first and second sidewalls, and wherein the decoy stand further includes first and second arms extending from the respective first and second sidewalls; and
   wherein the tubular sleeve further includes third and fourth sidewalls which, in conjunction with the first and second sidewalls, define a square cross-sectional shape of the tubular sleeve, and wherein the decoy stand further includes third and fourth arms extending from the respective third and fourth sidewalls.
2. The decoy stand of claim 1, further comprising a stop coupled to the extension pole to limit an extent to which the extension pole is telescopically received within the tubular sleeve and the tubular base pole.

3. The decoy stand of claim 2, wherein the stop is configured as a pin, and wherein the extension pole includes a side wall having an aperture through which the pin is removably received.

4. The decoy stand of claim 3, wherein the aperture is a first aperture, and wherein the extension pole further includes a second aperture in the side wall through which the pin is alternately removably received to provide an alternate overall height of the decoy stand.

5. The decoy stand of claim 2, wherein the tubular sleeve includes a top end, and wherein the stop is engaged with the top end to limit the extent to which the extension pole is telescopically received within the tubular sleeve and the tubular base pole.

6. The decoy stand of claim 1, wherein at least one of the first, second, third, and fourth arms extends substantially obliquely from the tubular sleeve.

7. The decoy stand of claim 6, further comprising a sleeve mount interconnecting at least one of the first, second, third, and fourth arms with the tubular sleeve.

8. The decoy stand of claim 7, wherein the first arm includes a first segment received within the sleeve mount, and a second segment interconnecting the first segment and the first decoy mount.

9. The decoy stand of claim 1, wherein the first decoy mount is coupled to the first arm, and wherein the decoy stand further includes third, fourth, and fifth decoy mounts coupled to the second, third, and fourth arms, respectively.

10. The decoy stand of claim 1, wherein the second decoy mount is coupled coaxially with the extension pole.

11. The decoy stand of claim 1, further comprising a fifth arm coupling the second decoy mount with the extension pole.

12. The decoy stand of claim 11, wherein the second decoy mount is oriented substantially parallel with a longitudinal axis of the extension pole.

13. The decoy stand of claim 11, wherein the fifth arm is removably coupled to the extension pole.

14. The decoy stand of claim 1, further comprising a step extending from the base pole.

15. The decoy stand of claim 1, wherein the base pole includes a tapered lower end to facilitate pushing the base pole into the ground.

\* \* \* \* \*